United States Patent Office 3,188,174
Patented June 8, 1965

3,188,174
ALUMINUM PRODUCT AND ITS METHOD OF PREPARATION
William L. Kehl, Indiana Township, Allegheny County, and Meredith M. Stewart, Penn Hills Township, Allegheny County, Pa., assignors to Gulf Research & Development Company, Pittsburgh, Pa., a corporation of Delaware
No Drawing. Filed June 20, 1961, Ser. No. 118,240
14 Claims. (Cl. 23—143)

This invention relates to a crystalline alumina hydrate which has the approximate formula $Al_2O_3 \cdot 1.2$–$2.6H_2O$ and to a process for its preparation.

Alumina hydrates, which are precursors for catalytic aluminas, exist in a variety of forms. Each hydrate form is distinct from the others and upon dehydration yields a corresponding alumina having distinct physical and catalytic properties. The various hydrates include both amorphous and crystalline forms. Included among the crystalline forms are bayerite and boehmite. Bayerite is an alumina trihydrate, $Al_2O_3 \cdot 3H_2O$, and upon dehydration yields the catalytic alumina known as eta alumina. Boehmite is an alumina monohydrate, $Al_2O_3 \cdot H_2O$, and upon dehydration produces the catalytic alumina known as gamma alumina. The crystalline alumina hydrate prepared in accordance with this invention contains an intermediate quantity of water of hydration having less water of hydration than bayerite but more water of hydration than boehmite and having the approximate formula $Al_2O_3 \cdot 1.2$–$2.6H_2O$, but more commonly, $Al_2O_3 \cdot 1.4$–$2.4H_2O$. Upon dehydration this intermediate hydrate produces a distinct but not yet defined catalytic alumina form which is neither the eta alumina produced from bayerite nor the gamma alumina produced from boehmite.

That the intermediate alumina hydrate of this invention differs distinctly as a composition of matter as compared to both the higher hydrate, bayerite, and the lower hydrate, boehmite, is evident in many respects. One respect is that the intermediate alumina hydrate of this invention, following drying and calcination, when employed with iron group metals or noble metals, or mixtures thereof, results in catalysts of high activity in hydrogenative hydrocarbon conversion processes. For example, when the calcined anhydride of which the intermediate alumina of this invention is a precursor is employed as a support for certain catalytically active metals including platinum, palladium, nickel, cobalt, molybdenum, etc. the resulting catalyst possesses an especially high activity for the hydrogenative removal from hydrocarbon oils of deleterious impurities such as sulfur or nitrogen, as compared to eta alumina or gamma alumina, of which bayerite and boehmite, respectively, are precursors. The calcination product of the intermediate hydrate of this invention also has a distinct size distribution of pores in comparison to the calcination products of both bayerite and boehmite as determined by nitrogen adsorption tests.

Another distinction between the intermediate alumina hydrate of this invention, the higher hydrate bayerite, and the lower hydrate, boehmite, is apparent by virtue of the differing water loss characteristics of each during calcination. Bayerite, after being dried at about 250° F. for the removal of mechanically held water, upon further heating or calcination starts to lose its chemically bound water at about 360° F. and its water loss is substantially complete at about 480° F., containing less than 3 percent by weight of water at the latter temperature. The bayerite is not converted to eta alumina until the heating temperature reaches 450° F. Boehmite, after drying at about 250° F. for removal of mechanically held water, upon continued heating does not commence to lose its chemically bound water until reaching the temperature 750° F. and its water loss is substantially completed at about 930° F., at which temperature it contains less than 3 percent by weight of water. The conversion of boehmite to gamma alumina occurs at 850° F. The intermediate alumina hydrate of this invention, after losing its mechanically held water by drying at 250° F., upon further heating starts to lose its chemically bound water at 360° F. and completes its water loss at 930° F., at which temperature it contains less than 3 percent by weight of water. It achieves its, as yet undefined, anhydride structural state at 850° F. in which state the anhydride is substantially completely free of both eta alumina derived from bayerite and gamma alumina derived from boehmite. The discovery of distinct water loss temperature ranges for the various hydrates shows that each is distinct structurally from the others. It was also observed by X-ray diffraction tests that the intermediate hydrate of this invention does not dehydrate via the monohydrate, or boehmite, state. Therefore, both the drying data and X-ray diffraction data show that the anhydride of the intermediate alumina is distinct structurally from both eta alumina derived from bayerite and gamma alumina derived from boehmite.

The conventional method for the preparation of an alumina hydrate is by preparing separate aqueous solutions, the first aqueous solution containing aluminum ions and the second aqueous solution containing hydroxyl ions. According to the conventional method the solution containing hydroxyl ions is added to the solution containing aluminum ions. However, this conventional method does not produce a single hydrate of high purity but rather a random mixture of various hydrates. For example, if the aqueous solution containing aluminum ions is aqueous aluminum chloride and the aqueous solution containing hydroxyl ions is aqueous ammonium hydroxide, before any hydroxide is added to the aluminum chloride solution the pH of this latter solution is about 2.3. The addition of ammonium hydroxide to the aluminum chloride solution causes its pH to increase and within the pH range 3 to 4.5 non-filterable but non-ionic colloidal sol forms having the formula $Al(OH)_xCl_y$, where $x+y=3$. With continued addition of ammonium hydroxide, the dispersed non-ionized sol sets to a gel upon attaining a pH of about 5 to 5.5. Upon the formation of the gel the solution sets to such a high consistency that effective stirring is no longer possible. The product of this method is not a single hydrate but a varying mixture of hydrates including substantial quantities of bayerite, amorphous alumina and other hydrate forms such as gibbsite and nordstrandite.

In accordance with the present invention an alumina hydrate containing between 1.2 and 2.6 moles of water per mole of $Al_2O_3$ is produced by formation of an immediate crystalline precipitate from an ionized solution by avoiding intermediate formation of a non-ionized sol which leads to a gel rather than a precipitate. Precipitate formation is accomplished by maintaining the pH of the mixture in the basic rather than the acidic range throughout the mixing operation. In accordance with this invention, the final pH of the mixture can range between 12 and 7, but is preferably between 8.5 and 7. Maintenance of this pH range during mixing is accomplished by adding the aqueous solution containing aluminum ions in small increments to an aqueous ammonia solution with thorough mixing. The concentrations of the two solutions, the proportions thereof, the rate of addition of the acidic salt solution to the ammonium hydroxide solution and the thorough mixing are adapted to maintain the pH of the mixed solution in the basic range throughout the operation.

The process of this invention comprises adding incrementally to an aqueous solution of ammonia, an aqueous solution of an aluminum salt accompanied by thorough stirring until the pH of said ammoniacal solution is decreased to a minimum of 7, maintaining the temperature of the mixed solution above about 170° F., maintaining the mixed solution continuously saturated with ammonia, and recovering a precipitate of crystalline alumina hydrate containing between 1.2 and 2.6 moles of water per mole of $Al_2O_3$ which is substantially completely free of bayerite and boehmite. The precipitate is separated from the supernatant liquid and washed with a liquid maintained at a temperature above about 170° F. It is then dehydrated and activated by calcination at a temperature of at least 850° F.

The temperature of the mixing operation is critical to the crystalline form of the precipitate obtained. In order to recover the intermediate alumina hydrate of this invention in substantially pure form it is necesssary to maintain the temperature of the mixing solution at least above 170° F. and preferably above 180° F. at all times. The upper temperature limit can range to the boiling point of water or even higher if an enclosed pressurized vessel is employed. The upper temperature limit can be as high as 250° F. or more. However, at these temperatures it is difficult to retain an adequate quantity of ammonia in solution. At temperatures below 170° F. the intermediate alumina hydrate of this invention is no longer obtained in a substantially pure state and substantial quantities of the trihydrate, bayerite, start to form. As long as the intermediate hydrate precipitate of this invention remains in the wet state, its temperature should not drop below the range of this invention since at lower temperatures the intermediate hydrate precipitate of this invention, while in the wet state, tends to acquire water of hydration and become transformed from the intermediate hydrate state $Al_2O_3 \cdot 1.2$–$2.6H_2O$ to the trihydrate state $Al_2O_3 \cdot 3H_2O$, known as bayerite.

The addition of the aqueous aluminum salt solution to the aqueous ammonium hydroxide solution is of necessity a prolonged operation. The aluminum salt must be added intermittently with thorough stirring between increments. The mixing must proceed sufficiently slowly that even localized zones having a pH below 7 are avoided since such local zones would yield an amorphous gel rather than a crystalline precipitate, thereby destroying the purity of the intermediate crystalline hydrate otherwise achievable.

Because relatively high temperatures are employed in the practice of this invention it is important that the mixing vessel be saturated with ammonia throughout the mixing operation. There are two reasons for keeping the mixing slurry saturated with ammonia gas. First, in the high temperature range employed slight temperature fluctuations induce relatively great variations in the quantity of ammonia in solution. Slight increases in temperatures, for example, can expel from solution sufficient ammonia to drastically reduce the pH of the system. This not only diminishes the total yield of hydrate but produces localized or generalized zones in the acidic pH range thereby both reducing the purity of the intermediate crystalline hydrate being formed and peptizing any crystalline precipitate already formed converting it into an amorphous gel form. Once exposed to a pH below the range of this invention, the intermediate crystalline hydrate is irreversibly converted to an amorphous form and cannot subsequently be reconverted to its original state by increasing the pH. On the other hand, by maintaining the liquid in the slurry saturated with ammonia, a correction of any temperature fluctuation will realize the redissolution of the escaped ammonia back into the system, thereby concomitantly correcting the pH fluctuation.

The second reason for keeping the mixing slurry saturated with ammonia gas is that at the high temperatures required the quantity of ammonia which can be dissolved in aqueous solution is limited and unles a saturated ammonia solution is employed throughout the mixing operation the yield will be severely restricted. In order to increase the amount of ammonia in solution, superatmospheric pressures can be employed, for example, from 1 to 20 atmospheres.

The liquid in the mixing slurry can be maintained continually saturated with ammonia by various methods. For example, if relatively low mixing temperatures within the temperature range of this invention are employed, ammonia escaping from the mixing vessel can be returned by employing a long reflux column wherein escaping ammonia is dissolved in cool distillate and returned to the hot mixing vessel. Also, ammonia can be continuously bubbled through the mixing slurry. If the operation is performed in a closed vessel, an atmosphere of ammonia can be maintained above the slurry. By maintaining the pressure of the ammonia source at a constant value and by maintaining a constant mixing slurry temperature, the quantity of ammonia in the mixing slurry will advantageously remain constant during the mixing operation.

It is important that hydroxides of alkali metals, such as sodium and potassium hydroxide, not be employed in place of ammonium hydroxide in the practice of this invention. These metals interfere with the production of the pure intermediate alumina hydrate precipitate of this invention. It appears the presence of metallic impurities such as sodium catalyzes dehydration of higher alumina hydrates to the monohydrate, known as boehmite. Furthermore, in contrast to volatile ammonia, these metals remain as impurities in the hydrate which is formed, even after prolonged washings, and tend to reduce the catalytic activity of the final product. On the other hand, ammonia, being volatile, is completely vaporized during the drying operation. A further disadvantage in the use of sodium or potassium hydroxide is that trace quantities of these metals drastically inhibit the ability of a catalyst containing dehydrated alumina to undergo reactivation by the common means of burning carbonaceous impurities from the catalyst surface since these metals have low melting points and act as fluxes, tending to sinter active catalytic sites during high temperature catalyst reactivation.

A variety of aqueous solutions of aluminum salts can be employed including aqueous solutions of aluminum chloride and aluminum nitrate. Aqueous solutions of soluble aluminum salts of carboxylic acids such as aluminum formate or aluminum propionate can be employed. Aqueous aluminum sulfate solution is not advantageous since it is difficult to adequately remove sulfate from the product even by protracted washings. The molality of the aluminum salt solution is not critical and can range between 0.1 and 4.0 molality. Dilute solutions of not more than 1 or 2 molality are preferred.

The intermediate alumina hydrate precipitate which is formed remains stable as long as the temperature and pH remain within the range of this invention. However, if either pH or temperature vary outside the range of this invention, the intermediate alumina hydrate precipitate is transformed into another hydrate form. For example, if the temperature of wet precipitate drops below the range of this invention, a relatively rapid transformation to bayerite occurs. At temperatures below 170° F. the wet precipitate acquires additional water of hydration and assumes the trihydrate or bayerite form. However, once the precipitate has been deprived of mechanically held water by drying at 200° F.–300° F. it is no longer unstable and it can then be safely stored at room temperature for indefinite periods.

The intermediate alumina hydrate precipitate can be separated immediately from the supernatant liquid by filtration, decanting, centrifuging, or the like and then washed, dried and calcined. After separation from the supernatant liquid the precipitate is washed until it is substantially free from the anion of the aluminum salt.

The precipitate can be washed with water but is preferably washed with aqueous ammonia. It is important that the washing solution be maintained at a temperature above 170° F. or 180° F. in order to prevent transformation of the precipitate to bayerite. When the wash water no longer exhibits traces of chlorine, nitrate or other anion of the aluminum salt, the precipitate is dried at between about 200° F. to 300° F. to remove mechanically held water. It is then activated as a catalyst by calcining at a temperature of at least 850° F. and preferably between 900° F. to 1000° F. to remove almost all chemically combined water and to achieve its advantageous anhydride structure. The calcination temperature should be at least as high as the process temperature to which the alumina as a catalyst is to be subsequently subjected so that no water loss will occur during its use as a catalyst. The product of calcination is $Al_2O_3$ and is opaque, colorless, hard and contains less than 3 percent by weight of water. About 90 percent or more of its pore volume comprises pores having a radius sufficiently small to measure between 10 and 50 Angstrom units with an exceptionally large proportion of its pore volume comprising pores measuring between 20 and 40 Angstrom units. The product of calcination not only predominates in small pores but also has a high surface area, as determined by nitrogen adsorption tests.

*Example 1*

This test was performed at a temperature below the range of this invention to illustrate the criticality of temperature in obtaining an intermediate alumina hydrate precipitate of high quality.

An aqueous solution of aluminum chloride was prepared by placing 200 grams of $AlCl_3 \cdot 6H_2O$ in one liter of water and heating to 160° F. An aqueous ammonium hydroxide solution was prepared by mixing 400 milliliters of $NH_4OH$ (28 percent $NH_3$) with one liter of water and heating to 160° F. The aqueous aluminum chloride solution was added to the ammonium hydroxide solution dropwise while maintaining the mixture at 160° F. and with constant stirring. The final pH of the mixture was 8.2.

The precipitate formed was filtered and washed with 160° F. water until the wash water showed only a trace of chloride ion by testing with silver nitrate solution. The precipitate was then dried at 250° F. for 16 hours and calcined at 900° F. for 16 hours.

X-ray examination of the precipitate after drying but prior to calcining showed that it contained a substantial amount of the trihydrate, bayerite, as well as the intermediate hydrate, $Al_2O_3 \cdot 1.2-2.6H_2O$.

Following are the physical characteristics of the calcined alumina product:

| | |
|---|---|
| Pore volume (ml./gm.) | .34 |
| Average pore radius (A.) | 25 |
| Surface area (m.²/gm.) | 343 |
| Pore size distribution percent volume/pore radius (A.): | |
| 200+A. | 1.0 |
| 100–200 | 2.4 |
| 50–100 | 5.0 |
| 40–50 | 7.4 |
| 30–40 | 11.4 |
| 20–30 | 43.9 |
| 10–20 | 28.8 |
| 0–10 | 0 |

*Example 2*

This test was performed at a temperature within the range of this invention.

An aqueous solution of aluminum chloride was prepared by dissolving 200 grams of $AlCl_3 \cdot 6H_2O$ in one liter of water and heating to 200° F. An aqueous solution of ammonium hydroxide was prepared by mixing 400 milliliters of $NH_4OH$ (28 percent $NH_3$) with one liter of water and heating to 200° F. The aluminum chloride solution was added dropwise with constant stirring to the ammonium hydroxide solution. The resulting slurry was maintained at 200° F. during the mixing operation. The final pH of the mixture was 8.5. A total of 250 milliliters of $NH_4OH$ was continuously added during the reaction to replace ammonia lost by evaporation.

The precipitate was filtered and washed with 200° F. water until the wash water showed only a trace of chloride ion by testing. The precipitate was then dried at 250° F. for 16 hours and calcined at 900° F. for 16 hours.

X-ray diffraction pattern of the precipitate after drying but before calcining showed that it was the substantially pure intermediate hydrate of this invention and did not contain a detectable amount of bayerite or boehmite.

Following are the physical characteristics of the calcined alumina product:

| | |
|---|---|
| Pore volume (ml./gm.) | .44 |
| Average pore radius (A.) | 33.7 |
| Surface area (m.²/gm.) | 257 |
| Pore size distribution percent volume/pore radius (A.) | |
| 200+A. | .4 |
| 100–200 | 1.7 |
| 50–100 | 6.0 |
| 40–50 | 9.0 |
| 30–40 | 27.4 |
| 20–30 | 49.1 |
| 10–20 | 6.4 |
| 0–10 | 0 |

*Example 3*

Three thousand milliliters of $H_2O$ was placed in a round bottom flask which was fitted with a stirrer and heated to 180° F. Fifteen hundred milliliters of $NH_4OH$ (28 percent $NH_3$) was added and the mixture was brought to 180° F. Three thousand milliliters of $H_2O$ was heated to 180° F. and 600 grams of $AlCl_3 \cdot 6H_2O$ was dissolved in the water, maintaining the temperature at 180° F. This solution was added slowly to the hot ammonium hydroxide solution, maintaining the temperature at 180° F. and stirring rapidly. At the end of the addition the pH was 8.1. Escaping ammonia gas was entrapped in condensing water vapor and returned to the mixing vessel by means of a reflux column attached to the mixing vessel. The slurry was filtered and the precipitate was washed free of soluble salts with wash water heated to 180° F. After oven drying for 16 hours at 250° F. the precipitate was examined by X-ray diffraction and found to be the intermediate hydrate without detectable amounts of crystalline alumina trihydrate present (bayerite, gibbsite, nordstrandite).

*Example 4*

Two additional tests were conducted under conditions generally similar to the test described in Example 3, including use of a reflux column as described. The mixing temperature was 180° F. However, in one of these tests the addition of aluminum chloride solution was terminated at a pH of 9.8 and in the other test the addition of aluminum chloride solution was terminated at a pH of 11.3. In each test the final pH was reached rapidly after only small additions of aluminum chloride solution. In each test the precipitate was washed and then dried at 250° F. for 16 hours. X-ray diffraction showed that each precipitate was substantially completely the intermediate alumina hydrate of this invention.

Various changes and modifications can be made without departing from the spirit of this invention or the scope thereof as defined in the following claims.

We claim:

1. A process for producing alumina comprising slowly adding in increments and with stirring an aqueous acidic solution of an aluminum salt whose anion is removable from said alumina to a substantially alkali metal-free aqueous ammonium hydroxide solution, maintaining the pH of the ammonium hydroxide solution at a value above 7 throughout the addition of acidic aluminum salt solution, substantially avoiding even localized zones in said ammonium hydroxide solution below a pH of 7 during the addition of acidic aluminum salt solution, precipitating a crystalline alumina hydrate containing between 1.2 and 2.6 moles of water of hydration per mole of $Al_2O_3$, said alumina hydrate being unstable and tending to transform into a different hydrate of alumina, preventing said transformation by maintaining said alumina hydrate precipitate at a temperature above about 170° F. throughout the mixing operation and substantially as long as it is in the wet state, continuously maintaining ammonia saturation in the mixed solution sufficient to substantially avoid even localized zones below a pH of 7, separating said alumina hydrate from supernatant liquid and drying said alumina hydrate.

2. Claim 1 wherein said aluminum salt is selected from the group consisting of aluminum chloride and aluminum nitrate.

3. Claim 1 wherein said crystalline alumina hydrate drying step is performed at a temperature above about 200° F.

4. A process for producing alumina comprising slowly adding in increments and with stirring an aqueous acidic solution of an aluminum salt whose anion is removable from said alumina to a substantially alkali metal-free aqueous ammonium hydroxide solution, maintaining the pH of the ammonium hydroxide solution at a value above 7 throughout the addition of acidic aluminum salt solution, substantially avoiding even localized zones in said ammonium hydroxide solution below a pH of 7 during the addition of acidic aluminum salt solution, precipitating a crystalline alumina hydrate containing between 1.2 and 2.6 moles of water of hydration per mole of $Al_2O_3$, said alumina hydrate being unstable and tending to transform into a different hydrate of alumina, preventing said transformation by maintaining said alumina hydrate precipitate at a temperature above about 170° F. throughout the mixing operation and substantially as long as it is in the wet state, continuously maintaining ammonia saturation in the mixed solution sufficient to substantially avoid even localized zones below a pH of 7, separating said alumina hydrate from supernatant liquid, drying said alumina hydrate, and calcining said dried alumina hydrate at a temperature of at least 850° F.

5. A process for producing alumina comprising slowly adding in increments and with stirring an aqueous acidic solution of an aluminum salt whose anion is removable from said alumina to a substantially alkali metal-free aqueous ammonium hydroxide solution, maintaining the pH of the ammonium hydroxide solution at a value above 7 during the addition of acidic aluminum salt solution, substantially avoiding even localized zones in said ammonium hydroxide solution below a pH of 7 during the addition of acidic aluminum salt solution, precipitating a crystalline alumina hydrate containing between 1.4 and 2.4 moles of water of hydration per mole of $Al_2O_3$, said alumina hydrate being unstable and tending to transform into a different hydrate of alumina, preventing said transformation by maintaining said alumina hydrate precipitate at a temperature above about 170° F. throughout the mixing operation and substantially as long as it is in the wet state, continuously maintaining ammonia saturation in the mixed solution sufficient to substantially avoid even localized zones below a pH of 7, separating said alumina hydrate from supernatant liquid, and drying said alumina hydrate.

6. Claim 5 wherein said aluminum salt is selected from the group consisting of aluminum chloride and aluminum nitrate.

7. A process for producing alumina comprising slowly adding in increments and with stirring an aqueous acidic solution of an aluminum salt whose anion is removable from said alumina to a substantially alkali metal-free aqueous ammonium hydroxide solution, decreasing the original pH of the ammonium hydroxide solution to a basic value between 7 and 8.5 during addition of acidic aluminum salt solution, substantially avoiding even localized zones in said ammonium hydroxide solution below a pH of 7 during the addition of acidic aluminum salt solution, precipitating a crystalline alumina hydrate containing between 1.2 and 2.6 moles of water of hydration per mole of $Al_2O_3$, said alumina hydrate being unstable and tending to transform into a different hydrate of alumina, preventing said transformation by maintaining said alumina hydrate precipitate at a temperature above about 170° F. throughout the mixing operation and substantially as long as it is in the wet state, continuously maintaining ammonia saturation in the mixed solution sufficient to avoid even localized zones below a pH of 7, separating said alumina hydrate from supernatant liquid and drying said alumina hydrate.

8. Claim 7 wherein said aluminum salt is selected from the group consisting of aluminum chloride and aluminum nitrate.

9. A process for producing alumina comprising slowly adding in increments and with stirring an aqueous acidic solution of an aluminum salt whose anion is removable from said alumina to a substantially alkali metal-free aqueous ammonium hydroxide solution, maintaining the pH of the ammonium hydroxide solution at a value above 7 throughout the addition of acidic aluminum salt solution, substantially avoiding even localized zones in said ammonium hydroxide solution below a pH of 7 during the addition of acidic aluminum salt solution, precipitating a crystalline alumina hydrate containing between 1.2 and 2.6 moles of water of hydration per mole of $Al_2O_3$, said alumina hydrate being unstable and tending to transform into a different hydrate of alumina, preventing said transformation by maintaining said alumina hydrate precipitate at a temperature above about 180° F. throughout the mixing operation and substantially as long as it is in the wet state, continuously maintaining ammonia saturation in the mixed solution sufficient to substantially avoid even localized zones below a pH of 7, separating said alumina hydrate from supernatant liquid and drying said alumina hydrate.

10. Claim 9 wherein said aluminum salt is selected from the group consisting of aluminum chloride and aluminum nitrate.

11. A dry, hard crystalline alumina hydrate having between 1.2 and 2.6 moles of water of hydration per mole of alumina, said hydrate precipitated having a distinctive crystalline structure so that said hydrate is identifiable by X-ray diffraction analysis, said alumina hydrate tending to transform to a different hydrate form in the presence of water prior to drying but dried prior to transformation to a different hydrate form, said hydrate substantially free of alumina monohydrate and alumina trihydrate, said hydrate upon heating starting to lose its water of hydration at about 360° F. and completing loss of water of hydration at about 930° F. at which temperature it contains less than about 3 percent by weight of water.

12. Claim 11 wherein said alumina hydrate is substantially pure.

13. A calcined alumina anhydride whose precursor is a hard crystalline alumina hydrate having between 1.2 and 2.6 moles of water of hydration per mole of alumina, said precursor hydrate precipitated having a distinctive crystalline structure so that said precursor hydrate is identifiable by X-ray diffraction analysis, said precursor hydrate tending to transform to a different hydrate form in the presence of water prior to drying but dried prior to transformation to a different hydrate form, said precursor hydrate substantially free of alumina monohydrate and alumina trihydrate, said precursor hydrate upon heating starting to lose its water of hydration at about 360° F. and completing loss of water of hydration at about 930° F. at which temperature it contains less than about 3 percent by weight of water.

14. Claim 13 wherein said calcined alumina anhydride is derived from substantially pure alumina hydrate precursor.

References Cited by the Examiner
UNITED STATES PATENTS

| | | | |
|---|---|---|---|
| 1,337,192 | 4/20 | Buckner | 23—143 |
| 1,540,446 | 6/25 | Wilson | 252—463 X |
| 1,929,942 | 10/33 | Barclay | 23—143 |
| 1,953,201 | 4/34 | Tosterud | 23—143 |
| 2,377,547 | 6/45 | Fuchs | 23—143 |
| 2,406,420 | 8/46 | Weiser et al. | 252—463 X |
| 2,867,588 | 1/59 | Keith et al. | 23—143 X |
| 2,874,130 | 2/59 | Keith | 252—463 X |
| 2,887,455 | 5/59 | Cornelius et al. | 252—466 |
| 2,925,395 | 2/60 | Vander Haar | 252—466 |
| 2,932,620 | 4/60 | Fuener et al. | 23—143 X |
| 2,968,635 | 1/61 | Nixon | 252—463 X |
| 2,970,891 | 2/61 | Hinlicky | 23—143 |

MAURICE A. BRINDISI, *Primary Examiner.*